US012710948B2

(12) United States Patent
Medvinsky et al.

(10) Patent No.: US 12,710,948 B2
(45) Date of Patent: Aug. 18, 2026

(54) SOFTWARE DISTRIBUTION SYSTEM AND METHOD

(71) Applicant: ARRIS Enterprises LLC, Suwanee, GA (US)

(72) Inventors: Alexander Medvinsky, San Diego, CA (US); Xin Qiu, San Diego, CA (US); Tat Keung Chan, San Diego, CA (US); Jinsong Zheng, San Diego, CA (US); Ting Yao, San Diego, CA (US)

(73) Assignee: ARRIS Enterprises LLC, Horsham, PA (US)

( * ) Notice: Subject to any disclaimer, the term of this patent is extended or adjusted under 35 U.S.C. 154(b) by 535 days.

(21) Appl. No.: 18/205,222

(22) Filed: Jun. 2, 2023

(65) Prior Publication Data

US 2023/0393831 A1 Dec. 7, 2023

Related U.S. Application Data

(60) Provisional application No. 63/348,324, filed on Jun. 2, 2022.

(51) Int. Cl.
*G06F 8/61* (2018.01)
*G06F 8/71* (2018.01)
*H04W 4/021* (2018.01)

(52) U.S. Cl.
CPC .................. *G06F 8/63* (2013.01); *G06F 8/71* (2013.01); *H04W 4/021* (2013.01)

(58) Field of Classification Search
CPC ............. G06F 8/63; G06F 8/71; H04W 4/021
See application file for complete search history.

(56) References Cited

U.S. PATENT DOCUMENTS 8,387,038 B2 * 2/2013 Wheeler ................... G06F 8/63 717/176
8,997,249 B1 * 3/2015 Bushman ............ G06F 21/6218 705/56
11,461,093 B1 * 10/2022 Edminster ................. G06F 8/60
11,573,786 B1 * 2/2023 Kiselev ..................... G06F 8/10
2012/0167063 A1 * 6/2012 Detwiler ................ G06F 9/449 717/139

(Continued)

*Primary Examiner* — Marina Lee
(74) *Attorney, Agent, or Firm* — Chernoff, Vilhauer, McClung & Stenzel, LLP

(57) ABSTRACT

A method and apparatus for distributing a software release is disclosed. The method comprises accepting, in a software distribution system, a software download configuration from a software download system administrator, the software download configuration comprising: first information defining software post processing, the software post processing identifying: a software image to be included in the software release; and a post processing operation to be performed on the software image, the post processing operation associated with a post processing configuration specifying post processing operation parameters defining how the post processing operation is performed by the post processing server; and second information defining a restriction on distribution of the software release. The method further comprises submitting, to a post processing server, the software image for post processing according to the software download configuration to generate the software release; and providing the generated software release for download by the software consumer.

20 Claims, 9 Drawing Sheets

(56) References Cited

U.S. PATENT DOCUMENTS

| | | | | |
|---|---|---|---|---|
| 2016/0092209 | A1* | 3/2016 | Kuchibhotla | H04W 4/60 717/170 |
| 2019/0146773 | A1* | 5/2019 | Attard | H04L 63/08 717/169 |
| 2022/0066764 | A1* | 3/2022 | Rosenzwig | G06F 8/63 |

* cited by examiner

300

302 — Name: SB6100

304 — Description: Retail CommScope DOCSIS 3.0 cable modem software stack

- Release notes: <Description of new features and which bugs were fixed>

306 — Files included:

306A — Bootcode: File name pattern=(?<Filename>.+)\.boot
306B — LinuxOS: File name pattern=vmlinux
306C — Application: DOCSIS-NA-CableModem-V5.3.app 308 — Post Processing:

```
318 — PostProcess(Server1, /Commscope/Surfboard/DOCSIS3.0/PKCS7-Sign,
          320 — Zip(PostProcess(Server1, /Commscope/Surfboard/BCM/Sig-Encrypt, Bootcode),   306A
   322        324 — PostProcess(Server1, /Commscope/Surfboard/Linux/AESEncrypt, LinuxOS),   306B
              326 — PostProcess(Server1, /Commscope/Surfboard/DOCSIS3.0/Encrypt,
                       328 — PostProcess(Server1, /Commscope/Surfboard/DOCSIS3.0/Obfuscate, Application)   306C
                    )
                 )
```

310 — License Requirement:

310A — Product ID = 389
310B — License required for download: YES

FIG. 3

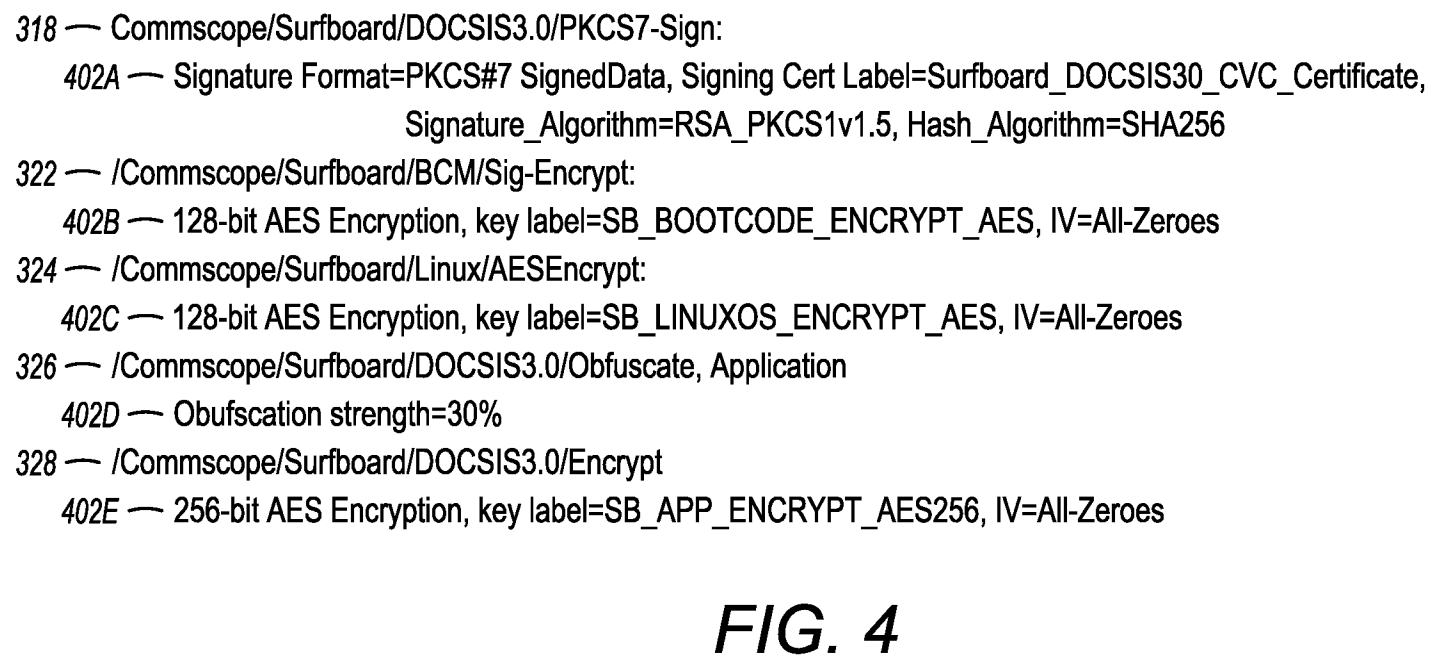

318 — Commscope/Surfboard/DOCSIS3.0/PKCS7-Sign:

402A — Signature Format=PKCS#7 SignedData, Signing Cert Label=Surfboard_DOCSIS30_CVC_Certificate, Signature_Algorithm=RSA_PKCS1v1.5, Hash_Algorithm=SHA256

322 — /Commscope/Surfboard/BCM/Sig-Encrypt:

402B — 128-bit AES Encryption, key label=SB_BOOTCODE_ENCRYPT_AES, IV=All-Zeroes

324 — /Commscope/Surfboard/Linux/AESEncrypt:

402C — 128-bit AES Encryption, key label=SB_LINUXOS_ENCRYPT_AES, IV=All-Zeroes

326 — /Commscope/Surfboard/DOCSIS3.0/Obfuscate, Application

402D — Obufscation strength=30%

328 — /Commscope/Surfboard/DOCSIS3.0/Encrypt

402E — 256-bit AES Encryption, key label=SB_APP_ENCRYPT_AES256, IV=All-Zeroes

FIG. 4

SOFTWARE DISTRIBUTION SYSTEM AND METHOD

CROSS-REFERENCE TO RELATED APPLICATIONS

The present application claims priority to U.S. Provisional Application No. 63/348,324 filed Jun. 2, 2022, the contents of which are each incorporated herein by reference in their entirety.

BACKGROUND

1. Field

The present disclosure relates to systems and methods for generating distributing software and in particular to a system and method for generating and releasing software according to a centralized authority.

2. Description of the Related Art

Software distribution systems are known in the art. Such systems enable authorized users to submit a software release for distribution (e.g. downloading) to customers. Exemplary software distribution systems include FLEXERA and SERVICENOW. With such systems, authorized software producers submit a binary code, and authorized administrators of the software distribution system enable customers to log in and download specific software releases.

With such existing software distribution systems, the software producer is responsible for taking all necessary steps to protect the software and assure it is only downloaded and used by authorized customers. This may include, for example, encrypting, obfuscating the software itself and signing the software release to allow the customer to be assured that the software release is genuine. However, it is possible that the software protection features intended for the software release are not included in the software release. This can happen because it was erroneously assumed that the software release included all of the necessary protections before uploading the software release to the software distribution system, or because the protections themselves were defective and at least partially non-functional.

If the expected protections are not in fact included in the software release, several negative outcomes may result. First, the customers' software download to an end product executing this software may fail. For example, if the software release was not properly signed, the download process may fail the signature validation step because the signature is missing, outdated, or otherwise defective. Second, an unobfuscated or unencrypted software release may be accidentally released, exposing any weaknesses in the code, and allowing the code to become a target for reverse-engineering or hacking by cyber-criminals.

What is needed is a system and method for distributing software releases that ensures the build itself meets specifications, prevents errors and prevents dissemination to unauthorized entities. The methods and systems described herein satisfy that need.

SUMMARY

To address the requirements described above, this document discloses a system and method for distributing a software release to a software consumer. In one embodiment, the method comprises: accepting, in a software distribution system, a software download configuration from a software download system administrator, the software download configuration comprising: first information defining software post processing, the software post processing identifying: a software image to be included in the software release; and a post processing operation to be performed on the software image, the post processing operation associated with a post processing configuration specifying post processing operation parameters defining how the post processing operation is performed by the post processing server; and second information defining a restriction on distribution of the software release. The method further comprises accepting, from a software producer, the software image for incorporation into the software release according to the software download configuration; submitting, to a post processing server, the software image for post processing according to the software download configuration to generate the software release; and providing the generated software release for download by the software consumer.

Another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout:

FIG. 3 is a diagram illustrating an exemplary embodiment of a software download configuration;

FIG. 4 is a diagram depicting exemplary post processing configurations associated with the software download configuration illustrated in FIG. 3;

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

As described above, with existing software distribution systems, the software producer is responsible for taking all necessary steps to encrypt, sign, or obfuscate the software release before submitting the software release to the software distribution system for customer download. But since such software release can include many software modules, it is possible that the software producer may neglect to perform such necessary strep, resulting in failed software downloads or compromise of the software itself. Software producers and vendors would benefit from a software distribution system which is better integrated with software protection steps.

Software producers may wish to include additional protection to a software release before it is distributed to end users, or offer their customers optional software features/add-ons for purchase, and to direct their customers to a means to generate licenses for such optional software features/add-ons. This benefits software vendors in the form revenue generated after their product is deployed to the customer, and also benefits customer end-users as they can elect to buy additional features as they desire or need.

The software distribution system operates with a number of entities, including a system administrator, a software producer, a post processing server, a software licensing system, and the software consumer. Using the software distribution system, the system administrator defines software download configurations. The software producer submits the software release to the software distribution system, and following such submission, the post-processing server performs post processing steps defined in the software download configuration, optionally, after querying the software distribution system to assure that the software producer is authorized to use the post processing system to perform the post processing steps. The software distribution system then queries a software licensing system to determine which licenses (if any) are required for the download and which licenses for optional features may be required if the customer has already purchased or elects to pay for such licenses. The software distribution system then allows the customer to download the software release, and the software consumer may then obtain licenses (optional or otherwise) from the software licensing system.

Software Distribution System

Figure 1:
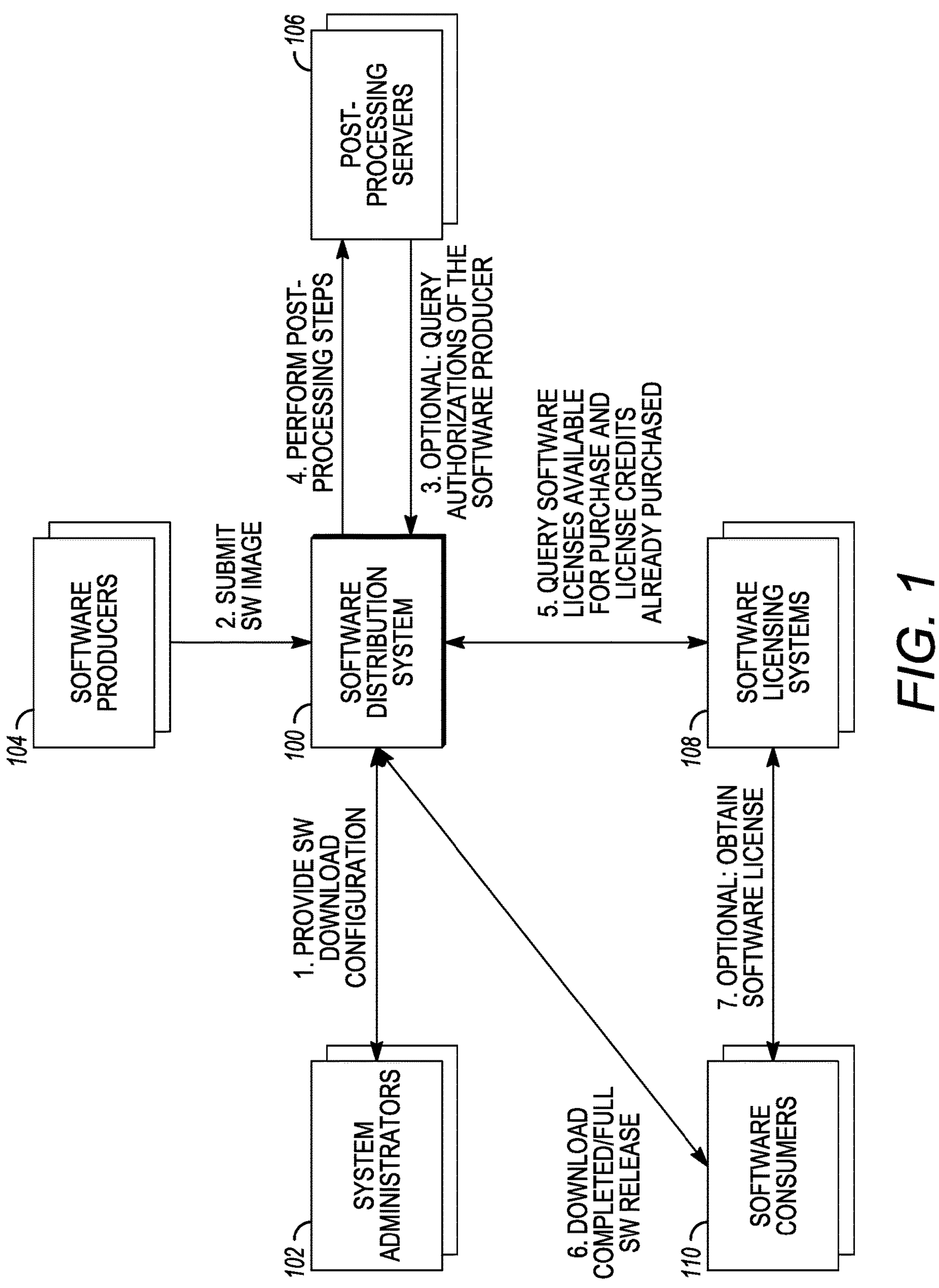
FIG. 1 is a diagram of the software distribution system and related architecture elements

FIG. 1 is a diagram of the software distribution system (SDS) 100 and related architecture elements. The SDS 100 is communicatively coupled to one or more system administrators 102, one or more software producers 104, one or more a post processing servers 106, one or more software licensing systems 108. Software consumers 110 communicate with the SDS to obtain software releases (builds) when completed.

In step 1, the system administrator 102 generates one or more software download configurations (described further below) and provides the software download configuration to the SDS 100. In step 2, the software producer submits one or more software images to the software distribution system 100, and in step 4, the post processing server 106 performs post processing steps as identified in the configured software download configuration provided by the system administrator 102. Optionally, before the post processing steps are performed, the post processing server 106 queries the SDS 100 to assure that the software producer 104 is authorized to have the post processing steps performed on the software image(s) to generate the software release, as shown in step 3.

In step 5, the software distribution system 100 optionally queries a software licensing system 108 to determine whether one or more licenses are associated with the software release (including both required and optional licenses), and to identify which of the identified licenses are available for purchase. In step 6, the software consumer 110 downloads the generated software release from the software distribution system 100 and optionally, obtains the required or optional software licenses from the software licensing system 108, as shown in step 7.

Figure 2:
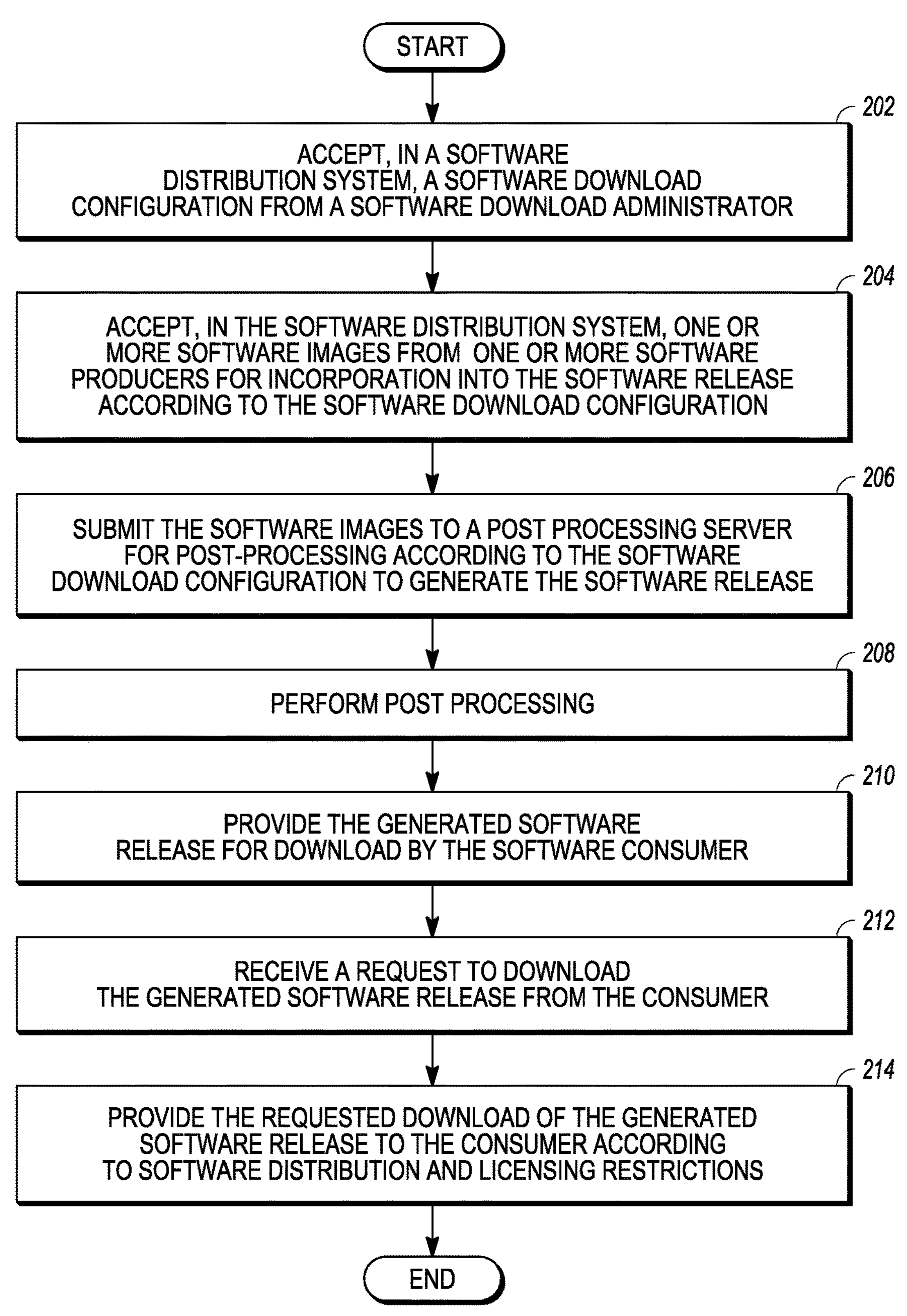
FIG. 2 is a diagram presenting further details regarding the operation of the software distribution system.

FIG. 2 is a diagram presenting further details regarding the operation of the software distribution system. In block 202, the SDS 100 accepts a software download configuration from the system administrator 102. The system administrator 102 may define the software download configurations offline of the SDS 100 or may interface with the SDS 100 to generate the software download configuration.

Software Download Configuration

Each software download configuration includes first information defining the post processing to be performed on software images to generate the software release.

The post processing identifies (1) the software image to be included in the software release and (2) one or more post processing operations to be performed on the software image(s). Each post processing operation is associated with a post processing configuration defining how the post processing operation is performed by the post processing server 106. Each software download configuration may also include second information identifying a restriction on the distribution of the software release. Such restrictions may be based on geographic boundaries or license requirements. The restrictions may also be a restriction by software consumer or to a subset of software consumers (e.g. the persons in possession of the devices that will be running the software) to all versions or particular versions of the software release. Distribution may be limited according to other entity definitions as well, for example, a particular software release may be restricted for use by particular device manufacturers or providers of a service.

FIG. 3 is a diagram illustrating an exemplary embodiment of a software download configuration 300. In the illustrated embodiment, the software download configuration 300 includes an identifier 302 or name of the software download configuration 300, a description 304 of the software release that will be generated using the software download configuration 300, the software image files including an identifier (such as a filename) of the software images to be included in the software release 306, the post processing 308 to be performed on the software images to generate the software release, and a license requirement configuration 310. In the illustrated embodiment, the software download configuration 300 identifies three software image files, including a boot code 306A, LINUX operating system 306B, and the application 306C.

The license requirement configuration 310 includes an identifier 310A of the software release as it is defined in the software licensing system 108, and an expression 310B specifying the licensing requirements. In the illustrated embodiment, the expression 310A is a simple "yes," indicating that a license is required for a download to be approved, but the expression 310A may combine a plurality of licensing requirements, and may be expressed in logical form, for example, by using Boolean logic operators. The software download configuration may also include a list of customers (e.g. companies or entities that are producing devices upon which the software release will be installed) that are authorized to receive the software release.

Additional information that can be included in the software download configuration 300 includes any geographic restrictions where the software release is limited or forbidden (or conversely, where allowed).

Post Processing

Post processing 308 defines operations or steps performed on each software image by the post processing server 106. The post processing 308 operations may include code signing, encryption, obfuscation, hashing, and logical and combination operations which that create or operate on logical combinations of the software images or the result of other operations. The software release resulting from such operations can be made tamper-evident because unauthorized modifications can be detected through a signature check, and can also be resistant to reverse engineering, by application of encryption and/or obfuscation to at least some of the software release. A different set of post processing steps/operations can be specified for each software image listed in the software download configuration 300, with each step specified by a configuration name in a post processing configuration (described below).

Each of the post processing steps or operations includes an operand that may include one of the plurality of software images or the result of another post processing operation, resulting in nested operations (e.g. PostProcess(operation1, PostProcess(operation2, software image).

The combination of post processing operations may be implemented by use of multiple operands. For example, a post processing operation that combines two software images (for example, by concatenating them) may be expressed as "PostProcess(combine, software image 1, software image 2) or PostProcess(combine, PostProcess(obfuscate, software image 1), PostProcess(obfuscate, software image 2). The post processing operations may also be combined or nested by logical operators, such as Boolean logic operators. A post processing operation may include additional parameters (for example, which part of the software image is signed or encrypted and which algorithms to use to perform the operation).

In the exemplary software download configuration 300 of FIG. 3. This software download configuration specifies a sequence of post processing operations in a scripting language.

The post processing step: "PostProcess(Server1,/Commscope/Surfboard/BCM/Sig-Encrypt, Bootcode)" 322 encrypts the boot code 306A on a post processing 106 server identified as "server 1" and adds the result to a file to be zipped;

The post processing step: "PostProcess(Server1,/Commscope/Surfboard/Linux/AESEncrypt, LinuxOS)" 324 encrypts a Linux OS 306B image on the post processing server 1 and adds the result to the file to be zipped;

The post processing step: "PostProcess(Server1,/Commscope/Surfboard/DOCSIS3.0/Encrypt, PostProcess (Server1,/Commscope/Surfboard/DOCSIS3.0/obfuscate, Application" 326 obfuscates the application image 306C on the post processing server 1, encrypts the result, then adds the result to the file to be zipped;

The Zip(●) operation 320 zips file to be zipped; and

The post processing step:

"PostProcess(Server1,/Commscope/Surfboard/DOCSIS3.0/PKCS7-Sign,) 318 signs the complete zipped package using a PKCS #7 signature on post processing server1.

The operations specified in the software download configuration 300 can be performed automatically after the software producer 104 uploads the software image(s) for processing, or may be performed through an interactive GUI-based interface presented to the software producer 104. An exemplary automated interface is described in U.S. Pat. No. 10,284,376 and U.S. Patent Publication 2021/0194704, both of which are hereby incorporated by reference herein. The automated interface is protected by a hardware token in the '376 patent, and protected by client certificates in the '704 publication.

The post processing operations in the software download configuration 300 are further defined in an associated post processing configuration, which specifies post processing operation parameters that define how the post processing operation is performed by the post processing server 106.

The post processing configuration may be included with the software download configuration 300 or presented separately. If not presented in the software download configuration 300, the software producers 104 may specify the post processing configurations to be used on the post processing server 106. Alternatively, even if post processing configurations are presented in the software download configuration 300, selected software producers 104 may be granted sufficient privileges by the system administrator 102 to override the post processing configurations in the software download configuration, and specify different post processing configurations.

FIG. 4 is a diagram depicting exemplary post processing configurations 402A-402E (hereinafter collectively referred to as post processing configuration(s) 402) associated with the software download configuration 300 illustrated in FIG. 3.

The post processing configuration 402A for the operation:

"Commscope/Surfboard/DOCSIS3.0/PKCS7-Sign" 318 defines the signature format and parameters. The result of the operation is Public Key Cryptography Standards (PKCS) #7 SignedData, and that data is created by applying the digital signature algorithm RSA_PCKS1 (version 1.5) and using the hash algorithm Secure Hash Algorithm (SHA)256 according to the signing digital certificate labeled "Surfboard_DOCSIS30_CVC_Certificate" representing the digital certificate stored in a key repository. The key repository may be an HSM (Hardware Security Module) communicatively coupled to the post processing server and Surfboard_DOCSIS30_CVC_Certificate may be a label which points to the certificate object on the HSM. A signing private key generating a digital signature included in the SignedData is also required. It may be found utilizing a label derived from the certificate label. In this example, Surfboard_DOCSIS30_CVC_Private_Key may be an automatically constructed label from the certificate label and it would point to a private key object located on the same HSM.

The post processing configuration 402B for the post processing operation "Commscope/Surfboard/BCM/Sig-Encrypt" 322 specifies 128-bit AES encryption, with the key used in the encryption labeled as SB_BOOTCODE_ENCRYPT_AES, and an initialization vector specified in the configuration. This label may be a label of an HSM object corresponding to 128-bit AES key.

The post processing configuration 402C for the post processing operation "Commscope/Surfboard/Linux/AES-Encrypt" 324 specifies 128-bit AES encryption, with the key used in the encryption labeled as SB_LINUXOS_ENCRYPT_AES, and an initialization vector specified in the configuration. This label may be a label of an HSM object corresponding to 128-bit AES key.

The post processing configuration 402D for the post processing operation: "Commscope/Surfboard/DOCSIS3.0/obfuscate, Application" 328 specifies that the strength of binary code obfuscation is 30%.

The post processing configuration 402E for the post processing operation: "Commscope/Surfboard/DOCSIS3.0/Encrypt" 326 specifies 256-bit AES encryption, with the key used in the encryption labeled as SB_APP_ENCRYPT_AES256, and an initialization vector specified in the configuration. This label may be a label of an HSM object corresponding to 256-bit AES key.

Returning to FIG. 2, as shown in block 204, the SDS 100 accepts one or more software images from one or more authorized software producer(s) 104 for incorporation into the software release according to the software download configuration provided by the system administrator 102. This can be accomplished via an interactive Graphical User Interface (GUI)-based interface, or with a transactional or Application Program Interface (API)-based interface that can be automated or scripted.

It is possible for different software producers 104 to author software images that are included on a single software release. For example, a first software producer 104 may author and submit the low level bootloader or boot code 306A previously described, a second software producer 104 may author and submit a LINUX operating system and root file system previously described, and yet another software producer 104 may submit an image of the application software 306C.

As described above, the post processing configurations 402 are typically specified in the software download configuration 300. However, in cases where they are not provided, the software producer 104 may be permitted to specify which post processing configurations are used by the post-processing server 106. The software producer 104 may also be granted sufficient privileges to override the post processing configurations specified in the software download configuration. Further, some software producers 104 may not be given access to all post processing configurations 402, because some post processing configurations may be confidential or proprietary to particular customers or applications, or software producers 104.

Returning to FIG. 2, as shown in block 206, the SDS 100 submits post processing information comprising the software images (or a processed version of the software image such as a hash) to the post processing server 106 for post processing according to the software download configuration. This step can take place automatically after the software producer 104 uploads the software image, or can take place interactively, through a user interface, with the system administrator 102 or the software producer 104 directing that the post processing steps be performed.

The SDS 100 also submits the post processing configuration identifier or name to the post processing server 106. As described above, the post processing configuration identifier or name specifies a plurality of post processing parameters that describe how the requested operation (e.g. signature, encryption, obfuscation, hash) is to be performed (including, for example, the operation itself, the cryptographic algorithms utilized to perform the operation, which cryptographic keys are used to perform the operation, the output format). For example, in the illustrative embodiment depicted in FIGS. 3 and 4, the post processing operation:

PostProcess(Severl,/Commscope/Surfboard/BCM/Sig-Encrypt,Bootcode) 322 has a corresponding post processing configuration identifier:

/Commscope/Surfboard/BCM/Sig-Encrypt and a corresponding post processing configuration 402B that specifies 128-bit AES Encryption, performed with the SB_LINUXOS_ENCRYPT_AES key, and an initialization vector specified in the configuration.

In one embodiment, a check is made to assure that the software producer is authorized to invoke the specified post processing configuration, before the post processing operations are performed to generate the software release. This can be accomplished in a number of different ways. In one embodiment, the SDS 100 enforces the limitation by comparing software producer identifiers (which may include simply alphanumeric IDs or digital certificates) with a list of approved software producers for each post processing configuration invoked. In this embodiment, the SDS 100 receives and manages the authorizations, and only submits the post processing operations for performance by the post processing server(s) 106 if the proper authorization exists for the post processing operations.

In another embodiment, the post processing server 106 verifies that the software producer 104 is authorized to perform the specified post processing operations before permitting the operations to be performed. This can be accomplished by receiving identifying information such as the identifier or digital certificate of the software producer 104 (whether with the post processing request or in response to a query from the post processing server 106), and comparing that identifying information with a list mapping software producers to approved post processing operations. This list may also be provided with the processing request or in advance of such request.

Figure 5:
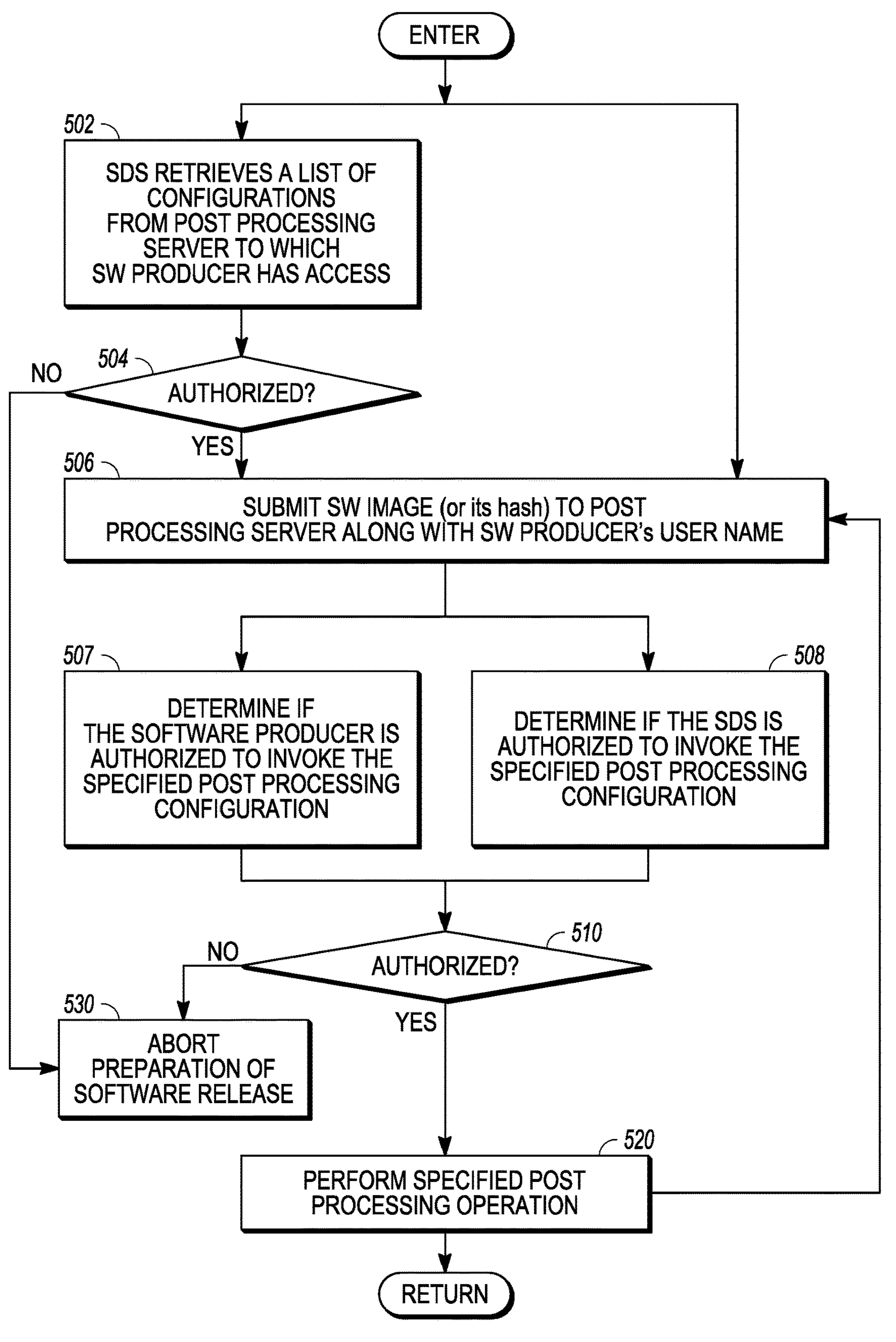
FIG. 5 is a diagram illustrating exemplary operations in verifying that the software producer is authorized to invoke the specified post processing configuration and in taking appropriate action based on such verification.

FIG. 5 is a diagram illustrating exemplary operations in verifying that the software producer 104 is authorized to invoke the specified post processing configuration and in taking appropriate action based on such verification. In block 502, SDS 100 optionally ahead of time retrieves a list of configurations for which software producer 104 is authorized from the post processing server 106. In block 504, if software producer 104 is authorized for all the post processing configurations required to post process this software release, or if authorization check is not implemented on the SDS 100, then the SDS 100 proceeds with block 506 and submits software image (or just its hash) to the post processing server 106 along with software producer's user name for the first post processing operation. Alternatively, if the software producer 104 is not authorized for all of the required post-processing configurations, preparation of a software release is aborted in block 530. The system administrator 102 or software producer 104 can be informed of the processing stoppage and the reasons therefor.

The post processing server 106 performs its own authorization check—it either checks that a specified software producer 104 is authorized for a particular post processing configuration (block 507) or it checks that the SDS 100 is authorized for a particular post processing configuration (block 508). In block 510, post processing server makes a decision if a requested post processing operation is authorized. If not authorized, it aborts with block 530 and otherwise proceeds with the requested post processing operation in block 520. If there are additional post processing steps to be performed for the same software release, then SDS in block 506 submits to the post-processing server another software image or hash that is part of the same software release.

If the optional operation of block 502 was taken to retrieve all of the post processing configurations for which a software producer 104 is authorized, then it may not be necessary to perform the additional authorization checking by the post processing server 106 as shown in blocks 507 and 508 and 510, and instead, all of the specified post processing operation is performed as shown in block 520.

Returning to FIG. 2, presuming that the software producer 104 is authorized to invoke the specified post processing configurations in the request, in block 208, the post processing server 106 performs the indicated operations and returns the resulting software download to the SDS 100.

The SDS 100 provides the generated software release for download by consumers, as shown in block 210. The SDS 100 later receives a request to download the generated software release from a consumer, as shown in block 212, and provides the generated software release according to software distribution restrictions and licensing requirements, as shown in blocks 212 and 214.

In some embodiments, no software license is required for a consumer to download and use the completed software release, and the software release is provided without restrictions. In other embodiments, the customer must meet qualifications before being permitted to download the software release and/or a software license must be obtained by the consumer before using the software release.

Restrictions on the Distribution of the Software Release

As described above, the software release may be provided according to one or more restrictions. Such restrictions include restrictions based on release status, geographic status (for example, customers located within certain countries may not be permitted to receive a particular download), restrictions based on the identity of the consumer (for example, a particular software release may be destined for all customers except customers in a particular group, or may be restricted to a particular set of consumers (e.g. those in possession of a particular model of device that will execute the software, those consumers that have paid for a particular service)). Such restrictions may affect which post processing operations are specified to be performed by the post processing server 106. For example, some countries may require that a particular encryption algorithm be utilized in the software release, while other countries require other encryption algorithms. Or the application itself may have different functionality based on intended distribution (e.g. one application may utilize digital rights management (DRM) algorithms which are to be used on one brand and model device, while another application for a different device or model may use different DRM algorithms).

Figure 6:
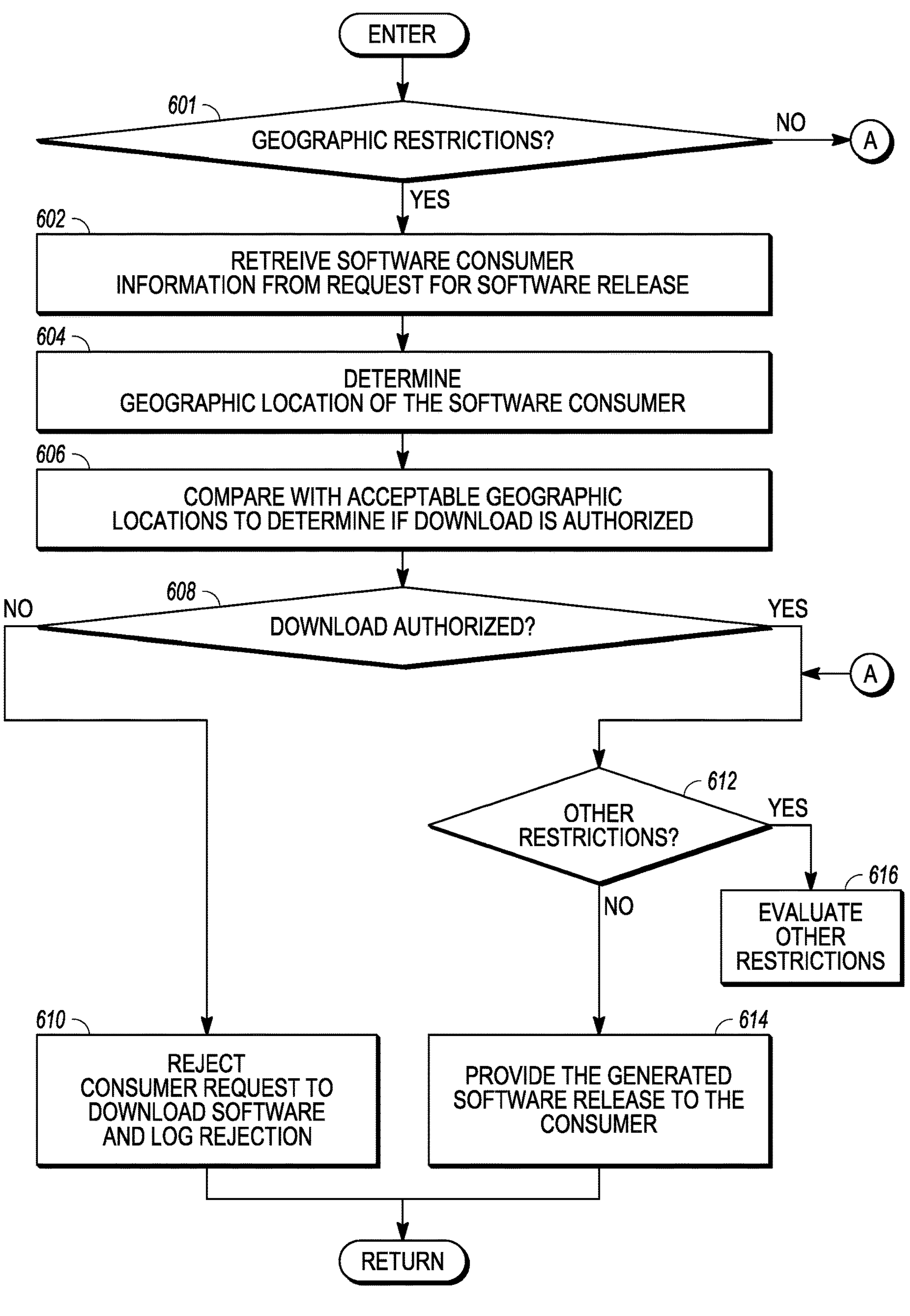
FIG. 6 is a diagram illustrating exemplary operations used to manage geographic restrictions of the software release.

FIG. 6 is a diagram illustrating exemplary operations used to manage geographic restrictions of the software release. In block 601 checks the software download configuration to determine if geographic restrictions are indicated. If no such restrictions are indicated, processing is routed to block 612, which checks if other restrictions are present. If there are no further restrictions, the generated software is provided to the consumer, as shown in block 614. If geographic restrictions are indicated, processing is routed to block 602. In block 602, the SDS 100 receives customer information based on the request for the software release. The customer information can be explicitly provided (for example, an identifier of the customer) or can be determined from the request itself (e.g. the internet protocol (IP) or Media Access Control (MAC) address from which the request originated). The identifier of the customer may include an identifier globally unique to the customer or a class of customer. For example, the identifier may include a model number of the device upon which the software release will be executed, thus identifying the customer as one in possession of a device having that model number.

In block 604, the geographic location of the software consumer is determined from the customer information. This can be accomplished by referring to a mapping between the provided customer information and the indicated location of the customer. For example, if the IP address from which the request originated is used for location information, a mapping between the IP address and the approximate location of the customer is used to determine the customer location.

In block 606, the determined geographic location is compared with acceptable geographic location(s) to determine if the software download is authorized. Block 608 routes processing to block 610 if the software download is not authorized because of geographic restrictions. In this case, the consumer request to download the software release is rejected and the rejection is logged. Block 608 routes processing to block 612 if the software is authorized in light of geographic restrictions. Block 612 checks to determine if other restrictions apply to the software release. The software consumer 110 or software producer's 104 identifying information such as the company name and address may be checked against various embargoes and restrictions. A government may institute prohibitions to deliver software products of any kind or with a specific export control code to a particular country or organization. If no other restrictions apply, the consumer request to download the software release is granted, and processing is routed to block 614 and the generated software release is provided for download. If other restrictions apply, processing is routed to block 616.

Figure 7:
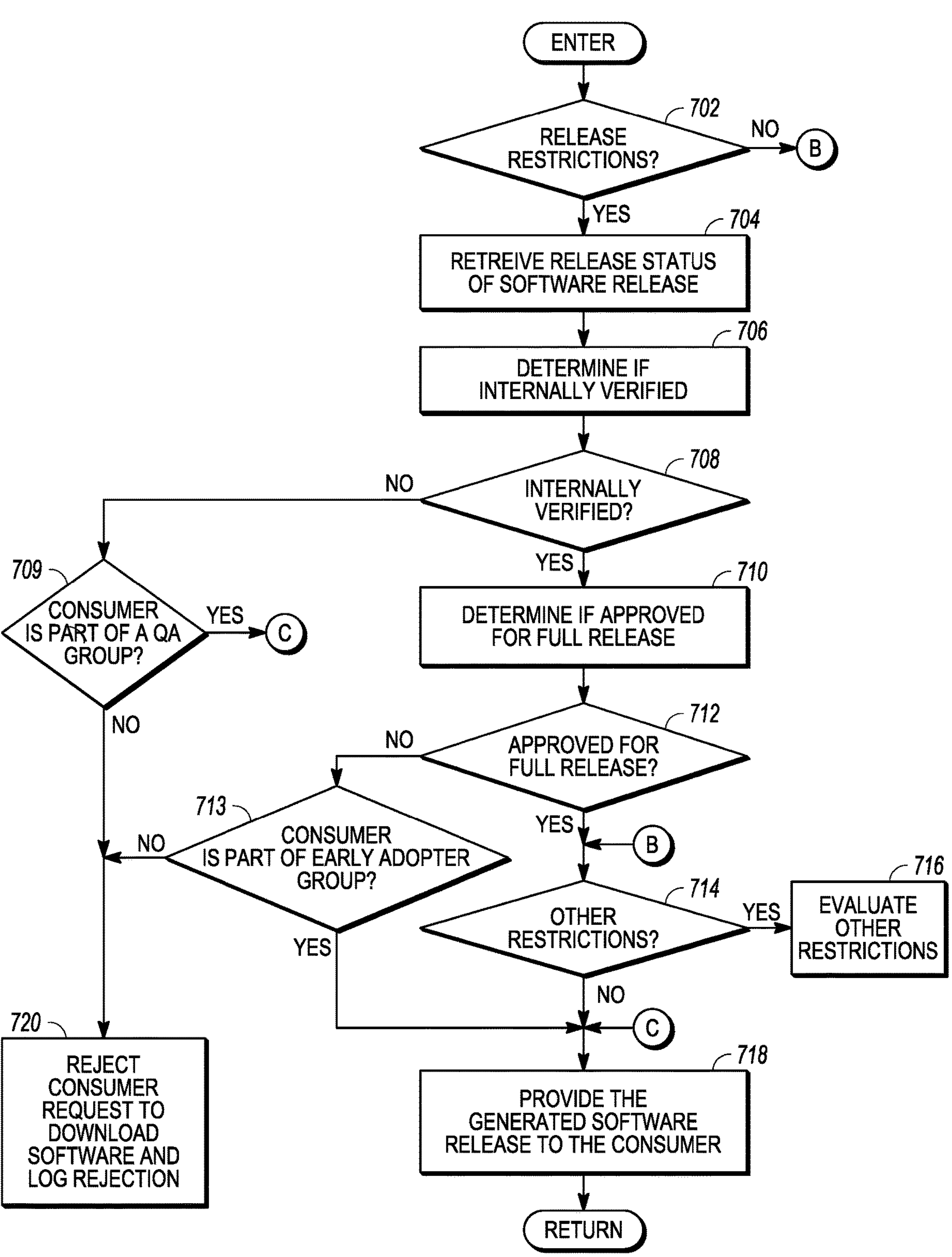
FIG. 7 is a diagram illustrating exemplary operations used to manage restrictions of the software release based on release status.

FIG. 7 is a diagram illustrating exemplary operations used to manage restrictions of the software release based on release status. Block 702 determines whether there are any release restrictions for the software release. If not, processing is routed to block 714, which determines whether there are other restrictions regarding the software release. If there are such restrictions, block 714 routes processing to evaluate the other such restrictions, as shown in block 716. If block 702 determines that there are release restrictions, processing is routed to block 704, which retrieves the release status of the software release. The release status is typically set by the system administrator 102 responsible for the software release, and may include a plurality of release statuses, each appropriate for the phase of development of the software. In the illustrated embodiment, three release statuses are envisioned: a first release status indicating that the software release is not yet internally verified, the second release status has been internally verified, but not approved for full release, and a third release status indicating that the software release has been internally verified and is also approved for full release status. The first release status, for example, may restrict it for download only to quality assurance (QA) engineers that belong to the same company as the software producer 104 and perform internal validation of the software release. The second release status, for example, may permit downloading of the software release to one or more individuals and entities that must review the software release and approve for a full release. Turning again to FIG. 7, block 706 determines if the software release has been internally verified. If the software release has been internally verified, block 708 routes processing to block 710, which determines if the software release has been approved for full release. If the software has not been internally verified, block 709 determines if the consumer is part of a QA group which is permitted to download unverified software releases. If yes, then software is released to the consumer in block 718 and otherwise the software download request is rejected in block 720. Likewise, if the software release is approved for full release, block 712 routes processing to block 714, otherwise, in block 713 checks if consumer is part of an early adopter group which is permitted to receive what may for example be called an alpha or a beta release. Block 714 routes processing to block 718, which provides the generated software release to the customer unless other restrictions must be considered.

Licensing Requirements

As described above, in one embodiment, the SDS 100 queries a software licensing system to determine which licenses (if any) are required for the download and which licenses for optional features may be required if the customer has already purchased or elects to pay for such licenses. The SDS 100 then allows the customer to download the software release, and the software consumer may then obtain licenses (optional or otherwise) from the software licensing system.

Figure 8:
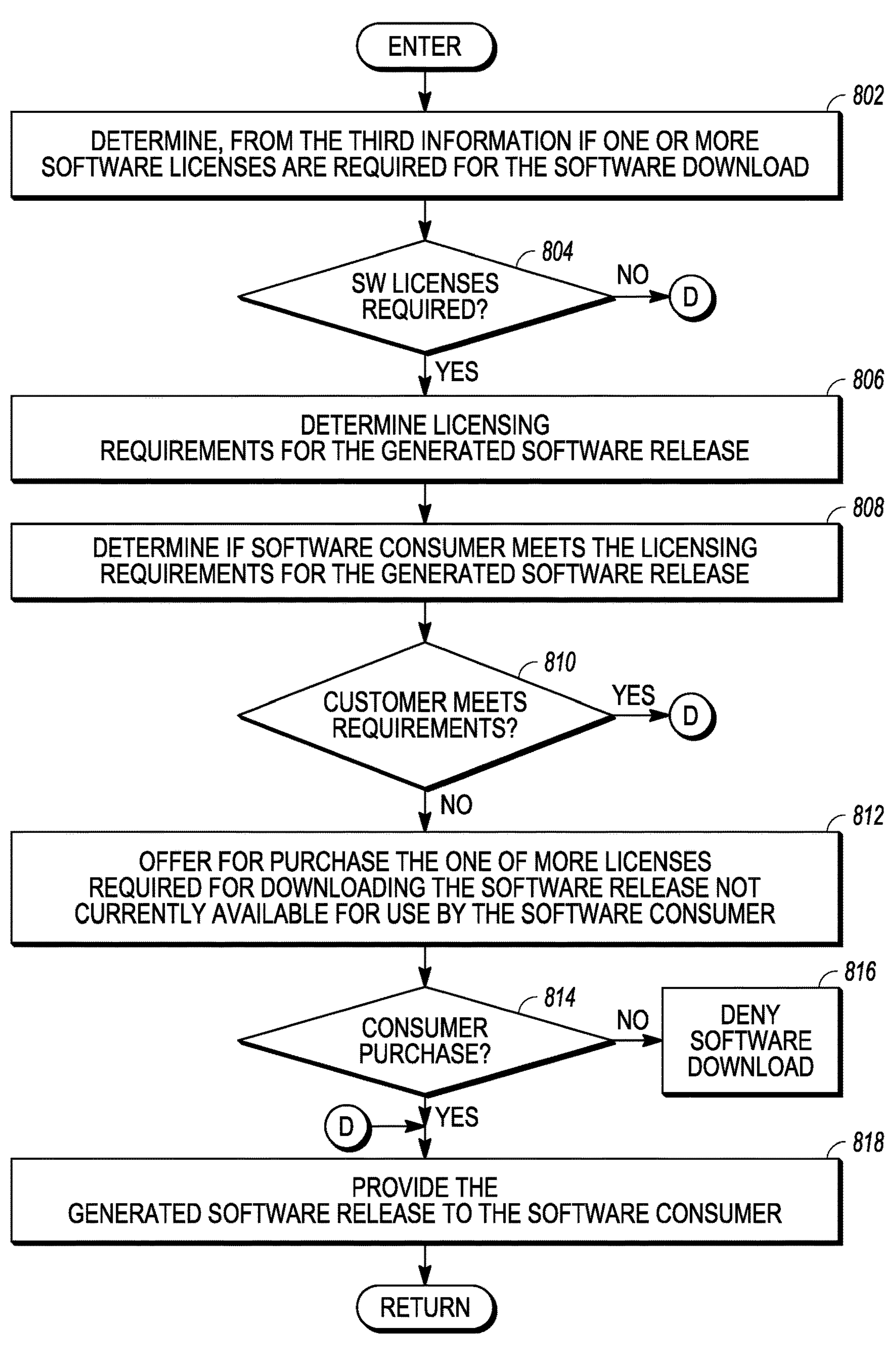
FIG. 8 is a diagram illustrating further details regarding the integration of licensing features with the software distribution system.

FIG. 8 is a diagram illustrating further details regarding the integration of licensing features with the SDS 100. In block 802, the SDS 100 determines whether one or more software licenses are required for some or all of the functionality of the software release. This is determined from information in the software download configuration 300. For example, in the embodiment of the software download configuration 300 illustrated in FIG. 3, expression 310A identifies the generated software release and expression 310B indicates that a license is required for the download. Block 804 routes processing to block 818 if a software license is not required, and to block 806 if a software license is required. If a software license is required, block 806 determines the licensing requirements, by reading and interpreting the information in the software download configuration 300. Block 808 determines if the software consumer meets the software licensing requirements. This may be accomplished by using the customer-supplied identifier and a mapping between such identifiers and the licensing requirements for the requested software release. For example, as shown in FIG. 1, the SDS 100 may perform the optional step of querying a software licensing system 108 associated with the software release to determine which licenses are available for purchase for the software release, and whether the customer has already purchased the licenses. Such purchases may be in the form of a separate purchase for each license, or credits that are purchased and provided to the consumer that can be exchanged for desired software licenses (e.g. a license to one particular feature of the software release may require three credits, while the a license to another particular feature may require only a single credit).

Block 808 routes processing to block 818 if the customer meets the licensing requirements, and the generated software release is provided to the software consumer. If the consumer does not meet the licensing requirements for the requested software release, block 810 routes processing to block 812, in which an offer to purchase the one or more required licenses for downloading the software release that are not currently available for use by the software consumer (e.g. these software licenses have not been granted to the software consumer). This purchase can be handled by the SDS 100 as a proxy for the software licensing system 108, or the software consumer 110 can be referred to the software licensing system 108 to make the necessary purchases.

Block 814 determines if the customer has purchased the required software licenses. If the required licenses have not been purchased, processing is routed to block 816, and the software download is denied. If the consumer has purchased the required software licenses, processing is routed to block 818, and the generated software release is provided for download.

Software licenses can also be handled by the SDS 100 having post processing operations that modify the software build or release to include a license requirement to unlock some or all of the features of the software release. In this embodiment, the SDS 100 queries the software licensing system(s) 108 to determine which software images require licensing (or whether the entire software release will require a license), and performs the require operations to render the software release usable only with a license. The SDS 100 then builds the software release with these features controlled by licensing requirements and provides the software release to the customer when requested. The software consumer then contacts the relevant software licensing system 108 to obtain the needed licenses.

Hardware Environment

Figure 9:
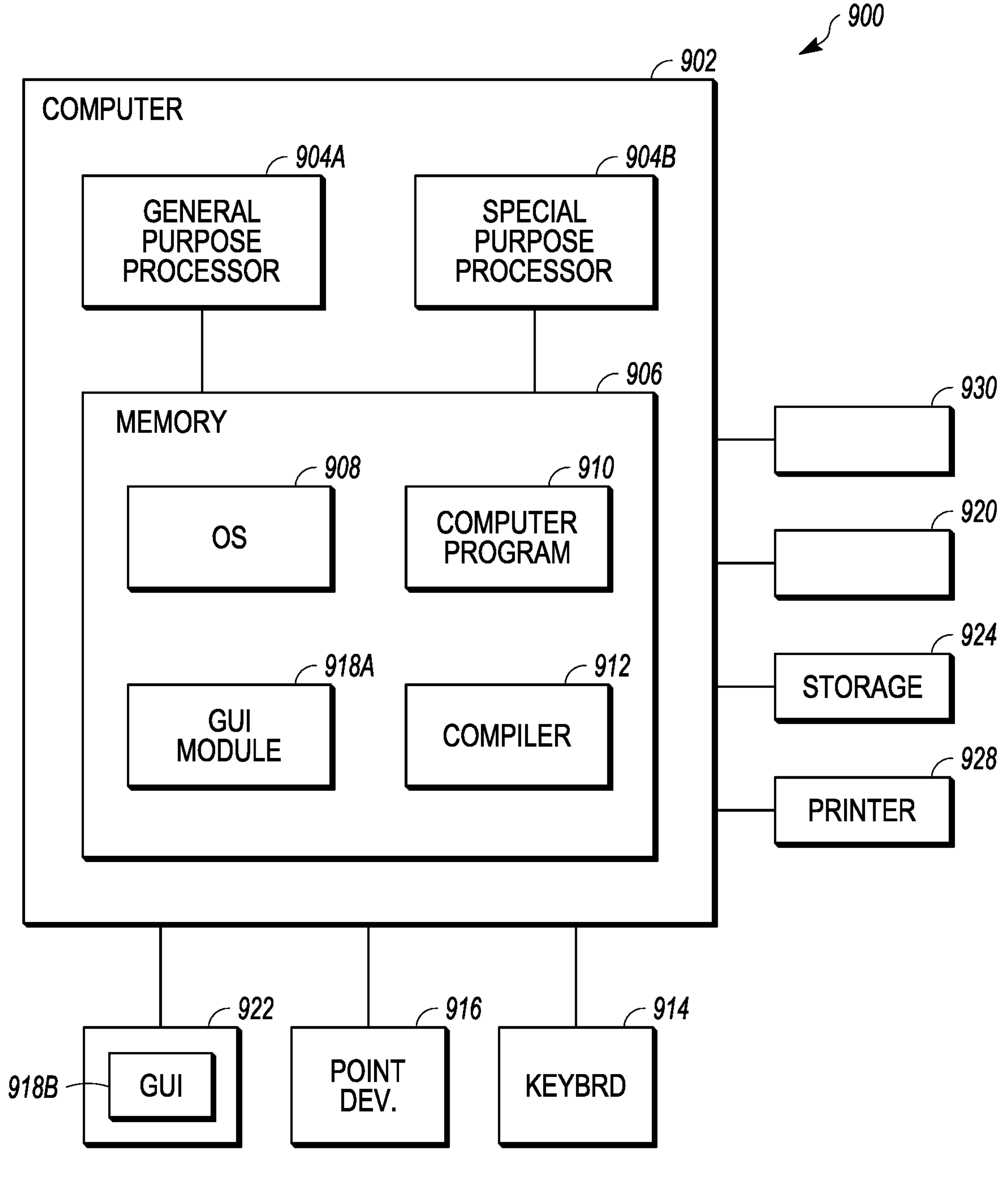
FIG. 9 illustrates an exemplary computer system that could be used to implement processing elements of the software distribution system and related elements.

FIG. 9 illustrates an exemplary computer system 900 that could be used to implement processing elements of the above disclosure, including the SDS 100, the post processing servers 106, the software licensing system 108 and the processors and computers used by the system administrators 102, software producers 104 and software consumers 110. The computer system 900 comprises a computer 902 that includes a processor 904 and a memory, such as random access memory (RAM) 906. The computer 902 is operatively coupled to a display 922, which presents images such as windows to the user on a graphical user interface 918B. The computer 902 may be coupled to other devices, such as a keyboard 914, a mouse device 916, a printer 928, etc. Of course, those skilled in the art will recognize that any combination of the above components, or any number of different components, peripherals, and other devices, may be used with the computer 902.

Generally, the computer 902 operates under control of an operating system 908 stored in the memory 906, and interfaces with the user to accept inputs and commands and to present results through a graphical user interface (GUI) module 918A. Although the GUI module 918B is depicted as a separate module, the instructions performing the GUI functions can be resident or distributed in the operating system 908, the computer program 910, or implemented with special purpose memory and processors. The computer 902 also implements a compiler 912 which allows an application program 910 written in a programming language such as COBOL, C++, FORTRAN, or other language to be translated into processor 904 readable code. After completion, the application 910 accesses and manipulates data stored in the memory 906 of the computer 902 using the relationships and logic that was generated using the compiler 912. The computer 902 also optionally comprises an external communication device such as a modem, satellite link, Ethernet card, or other device for communicating with other computers.

In one embodiment, instructions implementing the operating system 908, the computer program 910, and the compiler 912 are tangibly embodied in a computer-readable medium, e.g., data storage device 920, which could include one or more fixed or removable data storage devices, such as a zip drive, floppy disc drive 924, hard drive, CD-ROM drive, tape drive, etc. Further, the operating system 908 and the computer program 910 are comprised of instructions which, when read and executed by the computer 902, causes the computer 902 to perform the operations herein described. Computer program 910 and/or operating instructions may also be tangibly embodied in memory 906 and/or data communications devices 930, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

Disclosed is a system and method for distributing a software release to a software consumer. In one embodiment, the method comprises: accepting, in a software distribution system, a software download configuration from a software download system administrator, the software download configuration comprising: first information defining software post processing, the software post processing identifying: a software image to be included in the software release; and a post processing operation to be performed on the software image, the post processing operation associated with a post processing configuration specifying post processing operation parameters defining how the post processing operation is performed by the post processing server; and second information defining a restriction on distribution of the software release. The method further comprises accepting, from a software producer, the software image for incorporation into the software release according to the software download configuration; submitting, to a post processing server, the software image for post processing according to the software download configuration to generate the software release; and providing the generated software release for download by the software consumer.

Other embodiments are evidenced by the following:

The above method, wherein: the first information further identifies a plurality of software images that includes the software image; and a plurality of post processing operations that includes the post processing operation; and wherein accepting, from a software producer, the software image for incorporation into the software release according to the software download configuration comprises: accepting, from a software producer, the plurality of software images for incorporation into the software release according to the software download configuration; and further wherein: each of the plurality of post processing operations is associated with a post processing configuration specifying post processing operation parameters defining how the associated post processing operation is performed by the post processing server; the plurality of post processing operations each has an operand selected from a group comprising: one of the plurality of software images; and a result of another one of the plurality of post processing operations; the post processing operations are selected from the group comprising: a combination operation that combines the operand with a second operand; an encryption operation that encrypts the operand; an obfuscation operation that obfuscates the operand; a signing operation that signs the operand; and a hash operation that computes a hash of the operand.

Any of the above methods, wherein the plurality of post processing operations comprises a sequence of post processing operations specified in a scripting language.

Any of the above methods, wherein the restriction on distribution of the software release is selected from a group comprising: restriction by geographic boundary; restriction by software consumer; and restriction to a subset of software consumers.

Any of the above methods, wherein the post processing for the software release differs according to the restriction on distribution.

Any of the above methods, wherein: the restriction is by geographic boundary; and the method further comprises: receiving a request in the software distribution system for the generated software release from the software consumer; determining a geographic location of the software consumer; and providing the generated software release generated according to post processing steps for the geopolitical location of the software consumer.

Any of the above methods, wherein: the group comprising the restrictions on the distribution of the software release further comprise a release status, the release status selected from: a first release status indicating that the generated software release has not been internally verified; a second release status indicating that the software release has been internally verified, but not approved for full release; and a second release status indicating that the software release has been approved for full release.

Any of the above methods, wherein: the software download configuration defines a plurality of versions of the software release, each of the plurality of versions having associated first information and associated second information; and the group comprising the restrictions on the distribution of the software release comprises a restriction by software consumer to one or more of the plurality of versions of the software release.

Any of the above methods, wherein: the software download configuration further comprises third information defining licensing requirements for the generated software release, the third information having: an identification of the generated software release; an expression specifying the licensing requirements; and the method further comprises: receiving a request in the software distribution system for the generated software release from the software consumer; determining, from the third information, if one or more software licenses are required for the generated software release; if no software license is required for the generated software release, providing the generated software release for download by the software consumer; if one or more software licenses are required for the generated software release: determining licensing requirements for the generated software release; determining if the software consumer meets the licensing requirements for the generated software release; and providing the generated software release to the software consumer only if the software consumer meets the licensing requirements for the generated software release.

Any of the above methods, wherein the expression specifying the licensing requirements comprises a Boolean combination licensing requirements for each of the plurality of software images.

Any of the above methods, wherein: determining licensing requirements for the generated software release comprises: providing the identification of the generated software release and the identification of the software consumer to a software licensing system communicatively coupled to the software distribution system; receiving, from the software licensing system: information identifying one or more licenses required for downloading the software release; information indicating which of the one or more licenses required for downloading the software release are available for use by the software consumer. And wherein determining if the software consumer meets the licensing requirements for the generated software release comprises: comparing the information identifying the one or more licenses required for downloading the software release with the information indicating which of the one or more licenses is required for downloading the software release are currently available for use by the software consumer; determining if the software consumer meets the licensing requirements for the generated software release according to the comparison; and if the software consumer does not meet the licensing requirements for the generated software release, offering that the software consumer purchase any of the one or more licenses required for downloading the software release that are not currently available for use by the software consumer.

Any of the above methods, further comprising: (a) determining if the software producer is authorized to invoke the post processing configuration; (b) if the software producer is not authorized to invoke the post processing configuration: aborting preparation of the software release and notifying a system administrator of the post processing server that the software producer is not authorized to invoke the specified post processing configuration; or recording an identifier of the software producer.

Any of the above methods, wherein steps (a) and (b) are performed before performing any post processing operations.

Any of the above methods, wherein steps (a) and (b) are performed for each post processing operation before the post processing operation is performed.

Any of the above methods, wherein determining if the software producer is authorized to invoke the post processing configuration comprises: submitting an identifier of the software producer to the post processing server; providing a list of post processing configurations to which the identified software producer is authorized; and determining, in the post processing server, if the identified software producer is authorized according to the identifier and the list.

Any of the above methods, wherein: the software producer has privileges to override the post processing configuration or to select the post processing configuration for any post processing operation not specified in the software download configuration.

Another embodiment is evidenced by a software distribution system, comprising: a software distribution system configured to: accept, a software download configuration from a software download system administrator, the software download configuration comprising: first information defining software post processing, the software post processing identifying: a plurality of software images that includes the software image; and a plurality of post processing operations to be performed on the plurality of software images, each of the post processing operations associated with a post processing configuration specifying post processing operation parameters defining how the respective post processing operation is performed by the post processing server; and second information defining a restriction on distribution of a software release. The software distribution system is further configured to accept, from a software producer, the plurality of software images for incorporation into the software release according to the software download configuration; submit, to a post processing server, the software image for post processing according to the software download configuration to generate the software release; and provide the generated software release for download by a software consumer.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of distributing a software release to a software consumer, comprising:

accepting, in a software distribution system comprising a process and a memory, a software download configuration from a software download system administrator, the software download configuration comprising:
  first information defining software post processing, the software post processing identifying:
    a software image to be included in the software release; and
    a post processing operation to be performed on the software image, the post processing operation associated with a post processing configuration specifying post processing operation parameters defining how a post processing operation is performed by the post processing server; and
    second information defining a restriction on distribution of the software release;
accepting, from a software producer, the software image for incorporation into the software release according to the software download configuration;
submitting, to the post processing server, at least one of the software image and a processed version of the software image for the software post processing according to the software download configuration to generate the software release;
post processing by said post processing server at least one of said software image and said processed version of the software image according to the software download configuration to generate the software release, the generated software release being different than said software image, and providing said generated software release to said software distribution system; and
providing the generated software release from said software distribution system for download by the software consumer;
wherein said generated software release is free from said software download configuration.

2. The method of claim 1, wherein:
the first information further identifies:
  a plurality of software images that includes the software image; and a plurality of post processing operations that includes the post processing operation;

accepting, from the software producer, the software image for incorporation into the software release according to the software download configuration comprises:

accepting, from the software producer, the plurality of software images for incorporation into the software release according to the software download configuration;

wherein:

each of the plurality of post processing operations is associated with a post processing configuration specifying post processing operation parameters defining how the associated post processing operation is performed by the post processing server;

the plurality of post processing operations each has an operand selected from a group comprising:

one of the plurality of software images; and a result of another one of the plurality of post processing operations;

the post processing operations are selected from the group comprising:

a combination operation;

an encryption operation;

an obfuscation operation;

a signing operation; and a hash operation.

3. The method of claim 2, wherein the plurality of post processing operations comprises a sequence of post processing operations specified in a scripting language.

4. The method of claim 2, wherein the restriction on distribution of the software release is selected from a group comprising:

restriction by geographic boundary;

restriction by software consumer; and restriction to a subset of software consumers.

5. The method of claim 4, wherein the software post processing for the software release differs according to the restriction on distribution.

6. The method of claim 5, wherein:

the restriction is by the geographic boundary; and the method further comprises:

receiving a request in the software distribution system for the generated software release from the software consumer;

determining a geographic location of the software consumer; and providing the generated software release generated according to post processing steps for the geopolitical location of the software consumer.

7. The method of claim 4, wherein:

the group comprising the restrictions on the distribution of the software release further comprise a release status, the release status selected from:

a first release status indicating that the generated software release has not been internally verified;

a second release status indicating that the software release has been internally verified, but not approved for full release; and a third release status indicating that the software release has been approved for full release.

8. The method of claim 4, wherein:

the software download configuration defines a plurality of versions of the software release, each of the plurality of versions having associated first information and associated second information; and the group comprising the restrictions on the distribution of the software release comprises a restriction by software consumer to one or more of the plurality of versions of the software release.

9. The method of claim 2, wherein:

the software download configuration further comprises third information defining licensing requirements for the generated software release, the third information having:

an identification of the generated software release;

an expression specifying the licensing requirements;

the method further comprises:

receiving a request in the software distribution system for the generated software release from the software consumer;

determining, from the third information, if one or more software licenses are required for the generated software release;

if no software license is required for the generated software release, providing the generated software release for download by the software consumer;

if one or more software licenses are required for the generated software release:

determining licensing requirements for the generated software release;

determining if the software consumer meets the licensing requirements for the generated software release; and providing the generated software release to the software consumer only if the software consumer meets the licensing requirements for the generated software release.

10. The method of claim 9, wherein the expression specifying the licensing requirements comprises a Boolean combination licensing requirements for each of the plurality of software images.

11. The method of claim 10, wherein:

determining licensing requirements for the generated software release comprises:

providing the identification of the generated software release and the identification of the software consumer to a software licensing system communicatively coupled to the software distribution system;

receiving, from the software licensing system:

information identifying one or more licenses required for downloading the software release;

information indicating which of the one or more licenses required for downloading the software release are available for use by the software consumer;

determining if the software consumer meets the licensing requirements for the generated software release comprises:

comparing the information identifying the one or more licenses required for downloading the software release with the information indicating which of the one or more licenses is required for downloading the software release are currently available for use by the software consumer;

determining if the software consumer meets the licensing requirements for the generated software release according to the comparison; and if the software consumer does not meet the licensing requirements for the generated software release, offering that the software consumer purchase any of the one or more licenses required for downloading the software release that are not currently available for use by the software consumer.

12. The method of claim 1, further comprising:

(a) determining if the software producer is authorized to invoke the post processing configuration;

(b) if the software producer is not authorized to invoke the post processing configuration:

aborting preparation of the software release and notifying a system administrator of the post processing server that the software producer is not authorized to invoke the specified post processing configuration; or recording an identifier of the software producer.

13. The method of claim 12, wherein steps (a) and (b) are performed before performing any post processing operations.

14. The method of claim 12, wherein steps (a) and (b) are performed for each post processing operation before the post processing operation is performed.

15. The method of claim 12, wherein determining if the software producer is authorized to invoke the post processing configuration comprises:

submitting an identifier of the software producer to the post processing server;

providing a list of post processing configurations to which the identified software producer is authorized; and determining, in the post processing server, if the identified software producer is authorized according to the identifier and the list.

16. The method of claim 12, wherein:

the software producer has privileges to override the post processing configuration or to select the post processing configuration for any post processing operation not specified in the software download configuration.

17. A software distribution system, comprising:

the software distribution system comprising a processor and a memory and configured to:

accept, a software download configuration from a software download system administrator, the software download configuration comprising:

first information defining software post processing, the software post processing identifying:

a plurality of software images that includes the software image; and a plurality of post processing operations to be performed on the plurality of software images, each of a post processing operations associated with a post processing configuration specifying post processing operation parameters defining how the respective post processing operation is performed by the post processing server; and second information defining a restriction on distribution of a software release;

accept, from a software producer, the plurality of software images for incorporation into the software release according to the software download configuration;

submit, to the post processing server, the first instructions and the software image for the software post processing according to the software download configuration to generate the software release;

post processing by said post processing server said software image according to said software download configuration to generate the software release, the generated software release being different than said software image, and returning said generated software release to said software distribution system; and provide the generated software release from said software distribution system for download by a software consumer;

wherein said generated software release is free from said software download configuration.

18. The system of claim 17, wherein:

the plurality of post processing operations each has an operand selected from a group comprising:

one of the plurality of software images; and a result of another one of the plurality of post processing operations;

the post processing operations are selected from the group comprising:

a combination operation;

an encryption operation;

an obfuscation operation;

a signing operation; and a hash operation.

19. The system of claim 18, wherein the plurality of post processing operations comprises a sequence of post processing operations specified in a scripting language.

20. An apparatus comprising a processor and a memory for distributing a software release to a software consumer, comprising:

means for accepting, in a software distribution system, a software download configuration from a software download system administrator, the software download configuration comprising:

first information defining software post processing, the software post processing identifying:

a software image to be included in the software release; and a post processing operation to be performed on the software image, the post processing operation associated with a post processing configuration specifying post processing operation parameters defining how the post processing operation is performed by a post processing server; and second information defining a restriction on distribution of the software release;

means for accepting, from a software producer, the software image for incorporation into the software release according to the software download configuration;

means for submitting, to the post processing server comprising a processor and a memory, at least one of the software image and a processed version of the software image for the software post processing according to the software download configuration to generate the software release;

means for receiving from said post processing server said generated software release, the generated software release being different than said software image; and means for providing from the software distribution system the generated software release for download by the software consumer;

wherein said generated software release is free from said software download configuration.

* * * * *